United States Patent
Julien et al.

(10) Patent No.: US 11,187,143 B2
(45) Date of Patent: *Nov. 30, 2021

(54) ENGINE ASSEMBLY WITH INTERCOOLER (71) Applicant: PRATT & WHITNEY CANADA CORP., Longueuil (CA)

(72) Inventors: Andre Julien, Sainte-Julie (CA); Edwin Schulz, St-Bruno (CA); Michael Lanktree, La Prairie (CA); Serge Dussault, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 23 days.

This patent is subject to a terminal disclaimer.

(21) Appl. No.: 16/720,059

(22) Filed: Dec. 19, 2019

(65) Prior Publication Data

US 2020/0123964 A1 Apr. 23, 2020

Related U.S. Application Data

(63) Continuation of application No. 15/624,257, filed on Jun. 15, 2017, now Pat. No. 10,539,065.

(51) Int. Cl.
*F02B 29/04* (2006.01)
*F02B 37/00* (2006.01)
(Continued)

(52) U.S. Cl.
CPC ............ *F02B 29/0406* (2013.01); *F01C 1/22* (2013.01); *F02B 37/00* (2013.01); *F02B 37/004* (2013.01);
(Continued)

(58) Field of Classification Search
CPC .... F02B 29/0406; F02B 37/00; F02B 37/004; F02B 37/005; F02B 37/105; F02B 39/04;
(Continued)

(56) References Cited

U.S. PATENT DOCUMENTS 4,342,200 A * 8/1982 Lowi, Jr. ................. F25B 27/02
60/599
7,222,614 B2 * 5/2007 Bryant ................... F02B 33/446
123/559.1

(Continued)

*Primary Examiner* — Thai Ba Trieu
(74) *Attorney, Agent, or Firm* — Norton Rose Fulbright Canada LLP

(57) ABSTRACT

A method of operating an engine assembly receiving fuel, including admitting atmospheric air at a temperature $T_1$ through an inlet of a compressor having a pressure ratio of $PR_{GT}$, compressing the air in the compressor, cooling the compressed air from the compressor through an intercooler to cool the air from a temperature $T_{BIC}$ to a temperature $T_{AIC}$, delivering the cooled compressed air from the intercooler to an inlet of an intermittent internal combustion engine having an effective volumetric compression ratio $r_{VC}$, and further compressing the air in the intermittent internal combustion engine before igniting the fuel, where $$(PR_{GT})^a (r_{VC})^b \left(\frac{T_{AIC}}{T_{BIC}}\right)\left(\frac{T_1}{T_A}\right) < 1.$$

An engine assembly is also discussed.

24 Claims, 5 Drawing Sheets

(51) Int. Cl.
*F02B 37/10* (2006.01)
*F02B 39/04* (2006.01)
*F02B 41/10* (2006.01)
*F02B 53/04* (2006.01)
*F02B 53/08* (2006.01)
*F02B 61/04* (2006.01)
*F01C 1/22* (2006.01)
*F02D 41/00* (2006.01)
*F02B 53/00* (2006.01)

(52) U.S. Cl.
CPC .......... *F02B 37/005* (2013.01); *F02B 37/105* (2013.01); *F02B 39/04* (2013.01); *F02B 41/10* (2013.01); *F02B 53/04* (2013.01); *F02B 53/08* (2013.01); *F02B 61/04* (2013.01); *F02D 41/0007* (2013.01); *F02B 2053/005* (2013.01); *F02B 2275/32* (2013.01)

(58) Field of Classification Search
CPC .......... F02B 41/10; F02B 53/04; F02B 53/08; F02B 2053/005; F02B 2275/32; F02B 61/04; F01C 1/22; F02D 41/0007
USPC ................................................ 60/599, 624
See application file for complete search history.

(56) References Cited

U.S. PATENT DOCUMENTS

| | | | |
|---|---|---|---|
| 7,753,036 B2 | 7/2010 | Lents et al. | |
| 7,775,044 B2 | 8/2010 | Julien et al. | |
| 8,192,143 B2 | 6/2012 | Suciu et al. | |
| 8,215,292 B2* | 7/2012 | Bryant | F02B 33/44 123/559.1 |
| 8,511,967 B2 | 8/2013 | Suciu et al. | |
| 2011/0277467 A1 | 11/2011 | Davis | |
| 2014/0245999 A1* | 9/2014 | Gruber | F02B 29/0406 123/568.12 |
| 2015/0275749 A1 | 10/2015 | Thomassin et al. | |
| 2015/0275756 A1 | 10/2015 | Bolduc et al. | |
| 2016/0376021 A1* | 12/2016 | Ullyott | F01C 1/22 60/783 |
| 2016/0376022 A1* | 12/2016 | Ullyott | F02B 41/10 290/52 |
| 2016/0376023 A1* | 12/2016 | Ullyott | F01C 1/22 290/52 |
| 2016/0376981 A1* | 12/2016 | Ullyott | F01C 1/22 60/607 |

* cited by examiner

ENGINE ASSEMBLY WITH INTERCOOLER

This application is a continuation of U.S. application Ser. No. 15/624,257 filed Jun. 15, 2017, the entire contents of which are incorporated by reference herein.

TECHNICAL FIELD

The application relates generally to engine assemblies and, more particularly, to the temperature distribution within such engine assemblies.

BACKGROUND OF THE ART

In an engine assembly including an internal combustion engine, for example a compound engine assembly, it may be desirable to use a cycle in which auto-ignition is avoided. However, a number of factors have an effect on the auto-ignition of the combustion chamber, and it may be difficult to obtain an acceptable thermal efficiency while avoiding auto-ignition conditions.

SUMMARY

In one aspect, there is provided a method operating an engine assembly receiving fuel, the method comprising: admitting air at a temperature $T_1$ through an inlet of a compressor; compressing the air in the compressor, the compressor having a pressure ratio of $PR_{GT}$; cooling the compressed air from the compressor through an intercooler, the intercooler cooling the air from a temperature $T_{BIC}$ to a temperature $T_{AIC}$; delivering the cooled compressed air from the intercooler to an intermittent internal combustion engine, the intermittent internal combustion engine having an effective volumetric compression ratio $r_{VC}$; and further compressing the air in the intermittent internal combustion engine before igniting the fuel; wherein $$(PR_{GT})^a (r_{VC})^b \left(\frac{T_{AIC}}{T_{BIC}}\right)\left(\frac{T_1}{T_A}\right) < 1,$$

where: $T_A$ is a temperature of auto-ignition of the fuel in the intermittent internal combustion engine; $T_A$, $T_{BIC}$ and $T_{AIC}$ are in degrees Rankine; and a and b are dimensionless constants greater than or equal to zero.

In another aspect, there is provided a method of performing combustion in an engine assembly, the method comprising: admitting air at a temperature $T_1$ through an inlet of a compressor; compressing the air in the compressor, the compressor having a pressure ratio of $PR_{GT}$; cooling the compressed air from the compressor through an intercooler, the intercooler cooling the air from a temperature $T_{BIC}$ to a temperature $T_{AIC}$; delivering the cooled compressed air from the intercooler to an intermittent internal combustion engine, the intermittent internal combustion engine having an effective volumetric compression ratio $r_{VC}$; further compressing the air in the intermittent internal combustion engine before igniting the fuel; igniting the fuel and delivering an exhaust of the intermittent internal combustion engine to a turbine to drive a rotor of the turbine with the exhaust; wherein $$(PR_{GT})^a (r_{VC})^b \left(\frac{T_{AIC}}{T_{BIC}}\right)\left(\frac{T_1}{T_A}\right) < 1,$$

where: $T_A$ is a temperature of auto-ignition of the fuel in the intermittent internal combustion engine; $T_A$, $T_{BIC}$ and $T_{AIC}$ are in degrees Rankine; and a and b are dimensionless constants greater than or equal to zero.

In another aspect, there is provided an engine assembly configured to burn fuel, the engine assembly comprising: a compressor having a pressure ratio of $PR_{GT}$; an intercooler in fluid communication with an outlet of the compressor, the intercooler configured to cool air received from the compressor from a temperature $T_{BIC}$ to a temperature $T_{AIC}$; an intermittent internal combustion engine having an inlet in fluid communication with the compressor through the intercooler, the intermittent internal combustion engine having an effective volumetric compression ratio $r_{VC}$; wherein a pressure distribution between the compressor and the intermittent internal combustion engine is defined by $$(PR_{GT})^a (r_{VC})^b \left(\frac{T_{AIC}}{T_{BIC}}\right)\left(\frac{T_1}{T_A}\right) < 1,$$

where: $T_1$ is a temperature of the air at an inlet of the compressor; $T_A$ is a temperature of auto-ignition of the fuel in the intermittent internal combustion engine; $T_A$, $T_{BIC}$ and $T_{AIC}$ are in degrees Rankine; and a and b are dimensionless constants greater than or equal to zero.

DESCRIPTION OF THE DRAWINGS

Reference is now made to the accompanying figures in which.

DETAILED DESCRIPTION

Figure 1:
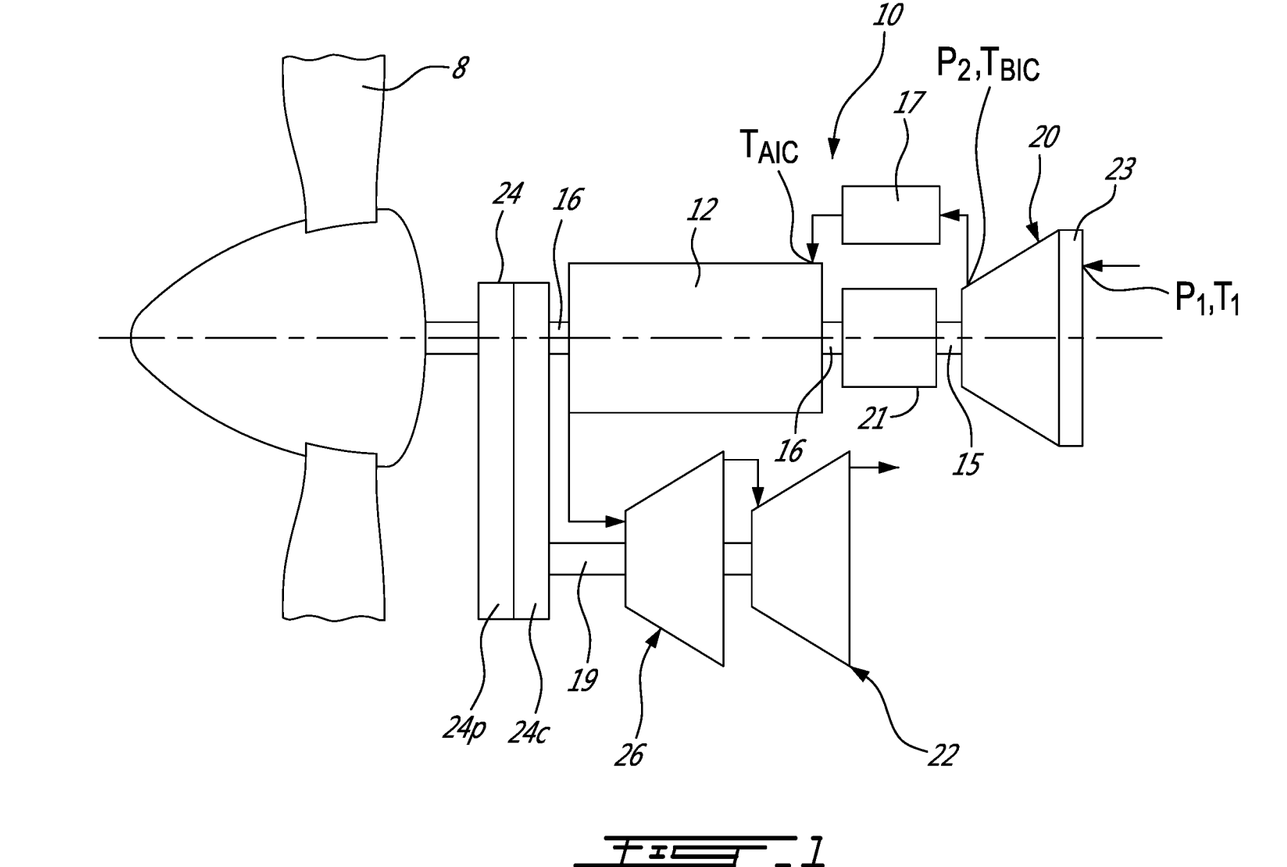
FIG. 1 is a schematic view of a compound engine assembly in accordance with a particular embodiment.

FIG. 1 illustrates a compound engine assembly 10 in accordance with a particular embodiment, which is configured as a turboprop engine. The compound engine assembly generally includes a boost compressor 20, an intercooler 17, an intermittent internal combustion engine 12 configured for example as a liquid cooled heavy fueled multi-rotor rotary intermittent combustion engine, and one or more turbines 26, 22 (two in the embodiment shown).

An engine shaft 16 is driven by the engine 12 and is drivingly engaged to a rotatable load, which is shown here as a propeller 8. It is understood that the engine assembly 10 may alternately be configured to drive any other appropriate type of load, including, but not limited to, one or more generator(s), drive shaft(s), accessory(ies), rotor mast(s), helicopter rotor(s), compressor(s), fan(s), or any other appropriate type of load or combination thereof, and that the engine assembly 10 may alternately be configured as a turboshaft engine, a turbofan engine, or an auxiliary power unit (APU).

The outlet of the boost compressor 20 is in fluid communication with the inlet of the engine 12 through the intercooler 17 so as to reduce the temperature of the compressed air prior to the compressed air entering the engine 12. Accordingly, air enters the compressor 20 and is compressed, and the compressed air flows through the intercooler 17 and then to the inlet of the engine 12. In a particular embodiment, the compressor 20 includes variable inlet guide vanes 23 through which the air flows before reaching the rotor(s) of the compressor 20.

In the embodiment shown the engine 12 is supercharged with the compressor 20 mounted in-line with the engine 12, i.e. the rotor(s) of the compressor 20 rotate co-axially with the engine shaft 16. The rotor(s) of the compressor 20 are engaged on a compressor shaft 15, and the engine shaft 16 is in driving engagement with the compressor shaft 15 through a step-up gearbox 21, which may include for example a planetary gear system. Other configurations are also possible; for example, the compressor 20 may be driven by the turbine(s) 22, 26. The compressor 20 may be single-stage device or a multiple-stage device and may include one or more rotors having radial, axial or mixed flow blades.

In the engine 12 the compressed air is mixed with fuel and combusted to provide power and a residual quantity of exhaust gas. Mechanical power produced by the engine 12 drives the propeller 8. The engine 12 provides an exhaust flow in the form of exhaust pulses of high pressure hot gas exiting at high peak velocity. The outlet of the engine 12 is in fluid communication with the inlet of the turbine(s) 22, 26, and accordingly the exhaust flow from the engine 12 is supplied to the turbine(s) 22, 26.

The turbine(s) 22, 26 includes at least one rotor engaged on a turbine shaft 19. Mechanical energy recovered by the turbine(s) 22, 26 is compounded with that of the engine shaft 16 to drive the propeller 8. In the embodiment shown, the two turbines 22, 26 are compounded with the engine 12 by the turbine shaft 19 being mechanically linked to, and in driving engagement with, the engine shaft 16 through a reduction gearbox 24, for example through an offset gear train with idler gear. The engine shaft 16 is also mechanically linked to, and in driving engagement with, the propeller 8 through the same reduction gearbox 24. In a particular embodiment, the reduction gearbox 24 includes two gear train branches: a compounding branch 24c mechanically linking the turbine shaft 19 and the engine shaft 16 and a downstream planetary branch 24p mechanically linking the engine shaft 16 and propeller 8. In another embodiment, the turbine shaft 19 and engine shaft 16 may be engaged to the propeller 8 through different gearboxes, or the turbine shaft 19 may be engaged to the engine shaft 16 separately from the engagement between the engine shaft 16 and the propeller 8.

In the embodiment shown, the engine assembly 10 includes a first stage turbine 26 receiving the exhaust from the engine 12, and a second stage turbine 22 receiving the exhaust from the first stage turbine 26, with the turbines 26, 22 having different reaction ratios from one another. In a particular embodiment, the first stage turbine 26 is configured to take benefit of the kinetic energy of the pulsating flow exiting the engine 12 while stabilizing the flow and the second stage turbine 22 is configured to extract energy from the remaining pressure in the flow. Accordingly, in a particular embodiment the first stage turbine 26 has a lower reaction ratio (i.e. lower value) than that of the second stage turbine 22. Other configurations are also possible.

Although not shown, in a particular embodiment the engine 12 has a coolant system, e.g. a liquid coolant system, which may be distinct from any fuel and lubricating system of the engine assembly 10, so that a dedicated coolant is circulated through the engine 12 separately and independently from the lubricant and the fuel of the engine assembly 10, and through an associated heat exchanger. The heat exchanger may be cooled by a same airflow flowing through the intercooler 17 to cool the compressed air, with the cooling airflow being produced for example by a same fan driven by the engine 12. Other configurations are also possible.

Figure 2:
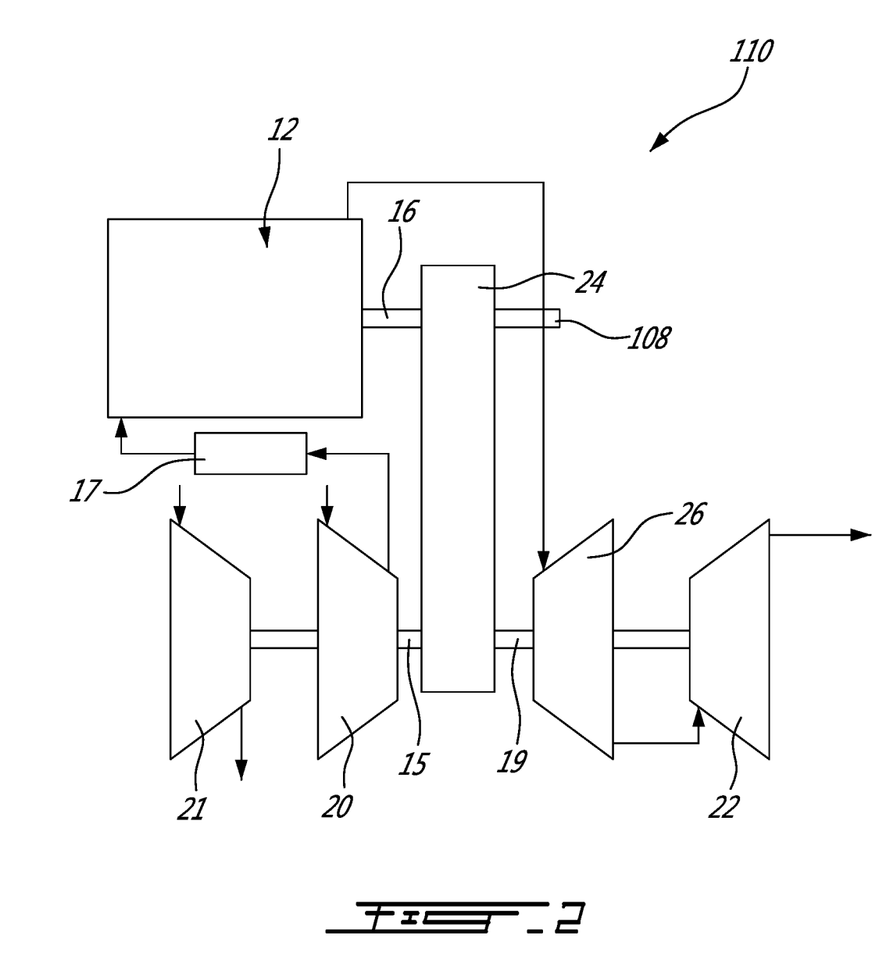
FIG. 2 is a schematic view of a compound engine assembly in accordance with another particular embodiment.

Referring to FIG. 2, a compound engine assembly 110 in accordance with another embodiment is shown, which may be used for example as auxiliary power unit (APU) for an aircraft; other uses are also possible. Elements similar to that of the engine assembly 10 are designated by the same reference numerals and will not be further described herein.

In this embodiment, power from the engine 12 and turbines 22, 26 is compounded to drive an output shaft 108, for example via the gearbox 24 defining a driving engagement between the engine shaft 16, the turbine shaft 19 and the output shaft 108. The compressor shaft 15 and turbine shaft 19 are coaxial and offset from the engine shaft 16. The compressor shaft 15 is in driving engagement with both the turbine shaft 19 and the engine shaft 16, for example via the gearbox 24, or by the compressor and turbine shafts 15, 19 being defined by different portions of a same shaft.

The boost compressor 20 is a supercharger compressor 20 compressing the air to feed the engine 12. The engine assembly 110 further includes a load compressor 21 for providing bleed air (e.g., for the aircraft), also in driving engagement with the compressor shaft 15. Both compressors 20, 21 receive atmospheric air and compress the air in parallel with each other, so that bleed air and compressed air for the engine 12 may be provided independently from each other. Alternately, the compressor 20 may act as both boost and load compressor, and simultaneously provide compressed air to the engine 12 and to the aircraft, for example through respective conduits branching off from the compressor outlet.

It is understood that the engine assemblies 10, 110 shown are provided as examples only, and that the engine assembly may have any other suitable configuration, including, but not limited to, the configuration of the compound cycle engine system or compound cycle engine such as described in Lents et al.'s U.S. Pat. No. 7,753,036 issued Jul. 13, 2010, or such as described in Julien et al.'s U.S. Pat. No. 7,775,044 issued Aug. 17, 2010, or such as described in Thomassin et al.'s U.S. patent publication No. 2015/0275749 published Oct. 1, 2015, or such as described in Bolduc et al.'s U.S. patent publication No. 2015/0275756 published Oct. 1, 2015, the entire contents of all of which are incorporated by reference herein. For example, the compound engine assembly 10, 110 may be configured as a single shaft engine assembly. The compound engine assembly 10, 110 may be used as a prime mover engine, such as on an aircraft or other vehicle, or in any other suitable application.

Moreover, it is understood that the engine assembly 10, 110 may have other configurations than that of a compound engine assembly. For example, the turbines 22, 26 may be omitted, or may rotate independently of the internal combustion engine 12.

In a particular embodiment of the engine assemblies 10, 110 shown, the engine 12 is a rotary intermittent internal combustion engine including two or more rotor assemblies drivingly engaged to the engine shaft 16. In another embodiment, the engine 12 includes a single rotor assembly. In a particular embodiment, the rotor assembly(ies) are configured as Wankel engines. It is however understood that other suitable types of internal combustion engine 12 may be used; for example, the engine 12 may be a reciprocating engine with one or a plurality of piston(s) engaged to the engine shaft 16.

Figure 3:
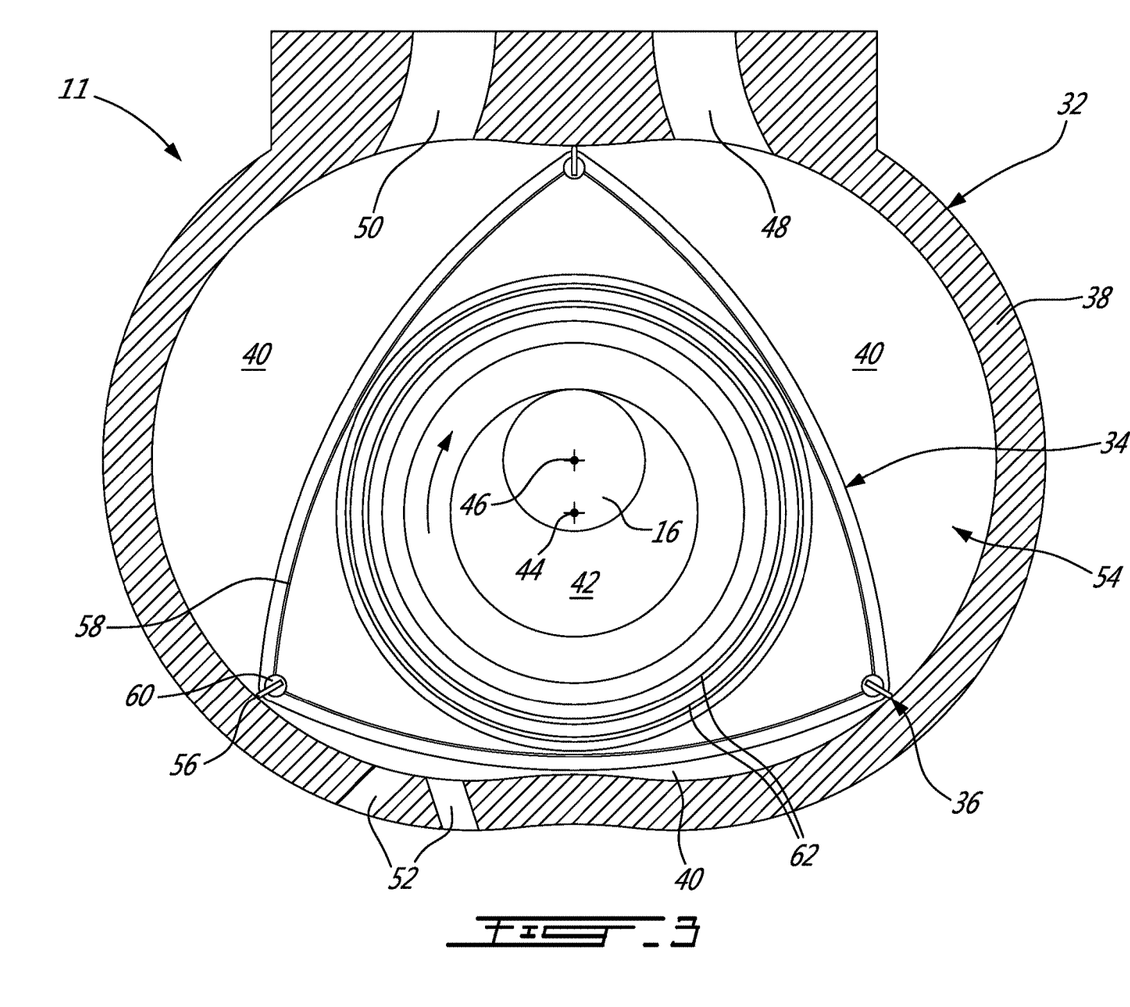
FIG. 3 is a schematic cross-sectional view of a Wankel rotor assembly which can be used in engine assemblies such as shown in FIGS. 1-2.

Referring to FIG. 3, an example of a Wankel engine which may define a rotor assembly 11 of the engine 12 is shown. It is understood that the configuration of the rotor assembly 11, e.g. placement of ports, number and placement of seals, number of apex portions, combustion chambers, etc., may vary from that of the embodiment shown.

The rotor assembly 11 comprises a housing 32 defining a rotor cavity having a profile defining two lobes, which is preferably an epitrochoid. A rotor 34 is received within the rotor cavity. The rotor in this embodiment defines three circumferentially-spaced apex portions 36, and a generally triangular profile with outwardly arched sides. The apex portions 36 are in sealing engagement with the inner surface of a peripheral wall 38 of the housing 32 to form and separate three combustion chambers 40 of variable volume between the rotor 34 and the housing 32. The peripheral wall 38 extends between two axially spaced apart end walls 54 to enclose the rotor cavity.

The rotor 34 is engaged to an eccentric portion 42 of the output shaft 16 to perform orbital revolutions within the rotor cavity. The output shaft 16 performs three rotations for each orbital revolution of the rotor 34. The geometrical axis 44 of the rotor 34 (and of the eccentric portion 42) is offset from and parallel to the axis 46 of the housing 32 (and of the shaft 16). During each revolution of the rotor 34, each combustion chamber 40 varies in volume and moves around the rotor cavity to undergo the four phases of intake, compression, expansion and exhaust.

An intake port 48 is provided, for example through the peripheral wall 38, for admitting compressed air into one of the combustion chambers 40; the intake port(s) 48 of the rotor assembly(ies) 11 together define the inlet of the engine 12. An exhaust port 50 is also provided, for example through the peripheral wall 38, for discharge of the exhaust gases from the combustion chambers 40; the exhaust port(s) 50 of the rotor assembly(ies) 11 together define the exhaust of the engine 12. Passages 52 for a spark plug, glow plug or other ignition source, as well as for one or more fuel injectors of a fuel injection system (not shown) are also provided, for example through the peripheral wall 38. Alternately, the intake port 48, the exhaust port 50 and/or the passages 52 may be provided through the end or side wall 54 of the housing. A subchamber (not shown) may be provided in communication with the combustion chambers 40, for pilot or pre injection of fuel for combustion, and the ignition mechanism may communicate with this subchamber.

For efficient operation the combustion chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

The fuel injector(s) of the engine 12, which in a particular embodiment are common rail fuel injectors (not shown), communicate with a source of, in a particular embodiment, heavy fuel (e.g. diesel, kerosene (jet fuel), equivalent biofuel), and deliver the heavy fuel into the engine 12 such that the combustion chamber is stratified with a rich fuel-air mixture near the ignition source and a leaner mixture elsewhere. Alternately, the injectors can inject a mix of air and fuel. In a particular embodiment, the fuel is a liquid fuel.

The effective volumetric expansion ratio $r_{VE}$ of a combustion chamber 40 corresponds to $V_{E1}/V_{E2}$, where $V_{E1}$ (not shown) is the working volume immediately before the exhaust port 50 is open (i.e., the maximum working volume during the portion of the expansion phase where the exhaust port is closed), and $V_{E2}$ (not shown) is the working volume at the beginning of the expansion phase (i.e., the minimum working volume during the expansion phase). The effective volumetric compression ratio $r_{VC}$ of a combustion chamber 40 corresponds to $V_{c1}/V_{c2}$, where $V_{c1}$ (not shown) is the working volume immediately after the inlet port 48 is closed (i.e., the maximum working volume during the portion of the compression phase where the inlet port 48 is closed), and $V_{c2}$ (not shown), is the working volume at the end of the compression phase (i.e., the minimum working volume during the compression phase). In a particular embodiment, all the combustion chambers 40 have the same effective volumetric compression ratio $r_{VC}$, which is considered to be the effective volumetric compression ratio $r_{VC}$ of the engine 12.

In a particular embodiment, the engine 12 operates under the Miller cycle, i.e., with a lower effective volumetric compression ratio $r_{VC}$ than its effective volumetric expansion ratio $r_{VE}$. In an embodiment where the engine 12 includes one or more rotor assembly(ies) 11, this may be obtained, for example, by positioning the inlet port 48 of one or more of the rotor assembly(ies) 11 to be closer to top dead center (TDC) than the exhaust port 50 to reduce the effective volumetric compression ratio $r_{VC}$. Alternately, the effective volumetric compression and expansion ratios $r_{VC}$, $r_E$ of the engine 12 may be similar or equal to each other.

In a particular embodiment, the pressure distribution between the engine 12 and the boost compressor 20 is defined by the following relation, so as to avoid auto-ignition of the fuel in the engine 12:

$$(PR_{GT})^a (r_{VC})^b \left(\frac{T_{AIC}}{T_{BIC}}\right)\left(\frac{T_1}{T_A}\right) < 1 \qquad \text{[Equation 1]}$$

where $PRG_T$ is the pressure ratio of the boost compressor 20, defined as $P_2/P_1$, where $P_2$ is the pressure at the outlet of the compressor 20, and $P_1$ is the pressure at the inlet of the compressor 20 (e.g., atmospheric pressure so $P_1 = P_{atm}$); $T_{AIC}$ is the absolute temperature after the intercooler and before the inlet of the engine 12, in Rankine [R]; $T_{BIC}$ is the absolute temperature before the intercooler, at the exit of the compressor in the case of adiabatic compression, in Rankine [R]; $T_A$ is the absolute inlet temperature at the inlet of the compressor, in Rankine [R]; and $T_A$ is the temperature of auto-ignition of the fuel in the engine 12, in Rankine [R]. The terms a and b are dimensionless constants. Exemplary embodiments of the location where T, $P_1$, $P_2$, $T_{AIC}$ and $T_{BIC}$ are measured with measuring devices (e.g. sensors) are shown in the engine assemblies 10, 110 of FIGS. 1-2.

If the engine 12 includes rotor assemblies 11 having different effective volumetric compression ratios $r_{VC}$ from one another, equation 1 may be applied to each rotor assembly 11 individually. Similarly, if the engine 12 include combustion chambers 40 having different effective volumetric compression ratios $r_{VC}$ from one another, equation 1 may be applied to each combustion chamber 40 individually.

In a particular embodiment where the boost compressor 20 performs an adiabatic compression and the engine 12 performs a polytropic compression, the constants have the following values: a=0.336±0.04 and b=0.32±0.04. Other values are also possible.

In a case where the boost compressor 20 performs a cooled compression with heat extraction during the compression, the heat removed during the compression can be taken into account and considered in equation 1 as being part of the intercooling, and an equivalent adiabatic compression is used in equation 1. Such an effect can be obtained, for example, with the boost compressor 20 including two or more compressor stages with intercooling between successive stages. The constant "a" in the term $(PR_{GT})^a$ of equation 1 has a value lower than 0.296, and is lower for cases where more cooling is performed. In the extreme case of an isothermal compression where the temperature is maintained constant, the constant "a" has a value of 0; however such an arrangement may not be beneficial in term of weight of the engine assembly 10, 110, particularly for an engine assembly 10, 110 used in aircraft. In a particular embodiment where the boost compressor 20 performs a cooled compression with heat extraction during the compression, the constant "a" has a value from 0.1 to 0.296; and in another particular embodiment where the boost compressor 20 performs a cooled compression with heat extraction during the compression, the constant "a" has a value from 0.2 to 0.296. Other values are also possible.

Similarly, in a case where the engine 12 performs a cooled compression with heat extraction during the compression, the heat removed during the compression can be taken into account and considered in equation 1 as being part of the intercooling, and an equivalent adiabatic compression is used in equation 1. The constant "b" in the term $(r_{VC})^b$ of equation 1 has a value lower than 0.28, and is lower for cases where more cooling is performed. In the extreme case of an isothermal compression where the temperature is maintained constant, the constant "b" has a value of 0; however such an arrangement may not be beneficial in term of weight of the engine assembly 10, 110, particularly for an engine assembly 10, 110 used in aircraft. In a particular embodiment where the engine 12 performs a cooled compression with heat extraction during the compression, the constant "b" has a value from 0.1 to 0.28; and in another particular embodiment where the engine 12 performs a cooled compression with heat extraction during the compression, the constant "a" has a value from 0.2 to 0.28. Other values are also possible.

The temperature of auto-ignition $T_A$ of the fuel in the engine 12 can vary and be affected for example by the air/fuel ratio, the size and shape of the combustion chamber 40, the heat losses within the combustion chamber 40, the type of fuel, the pressure within the combustion chamber 40, the parameters of fuel injection and atomisation, etc. In a particular embodiment, the temperature of auto-ignition $T_A$ of the fuel in the engine 12 has a value of 1380±100 R. Other values are also possible.

In a particular embodiment, the effective volumetric compression ratio $r_{VC}$ of the engine 12 has a value corresponding to one or more of the following: at most 8; about 8; at most 6; about 6; at most 5.5; about 5.5; at most 5; about 5; at most 4.5; about 4.5; at most 3; about 3; at most 2; about 2; from 2 to 8; from 2 to 6; from 2 to 5.5; from 2 to 5; from 2 to 4.5; from 2 to 3; from 3 to 8; from 3 to 6; from 3 to 5.5; from 3 to 5; from 3 to 4.5; from 4.5 to 8; from 4.5 to 6; from 4.5 to 5.5; from 4.5 to 5; from 5 to 8; from 5 to 6; from 5 to 5.5; from 5.5 to 8; from 5.5 to 6; from 6 to 8. In a particular embodiment where the effective volumetric compression ratio $r_{VC}$ of the engine 12 is equal to its effective volumetric expansion ratio $r_{VE}$, the effective volumetric compression ratio $r_{VC}$ has a value selected within a range defined from 4.5 to 8; for example, the effective volumetric compression ratio $r_{VC}$ may be within a range defined from 5.0 to 7.5. In another particular embodiment where the effective volumetric compression ratio $r_{VC}$ of the engine 12 is smaller than its effective volumetric expansion ratio $r_{VE}$ (Miller cycle), the effective volumetric compression ratio $r_{VC}$ has a value selected within a range defined from 2 to 5.5; the effective volumetric expansion ratio $r_{VE}$ may have a value selected within a range defined from 4.5 to 8. Other values are also possible.

In a particular embodiment, the pressure ratio $PR_{GT}$ of the boost compressor 20 has a value corresponding to one or more of the following: at most 12; about 12; at most 9; about 9; at most 8; about 8; at most 6; about 6; at most 4; about 4; at most 3; about 3; at most 2.5; about 2.5; from 2.5 to 12; from 2.5 to 9; from 2.8 to 8; from 2.5 to 6; from 2.5 to 4; from 2.4 to 3; from 3 to 12; from 3 to 9; from 3 to 8; from 3 to 6; from 3 to 4; from 4 to 12; from 4 to 9; from 4 to 8; from 4 to 6; from 6 to 12; from 6 to 9; from 6 to 8; from 8 to 12; from 8 to 9; from 9 to 12. In a particular embodiment where the effective volumetric compression ratio $r_{VC}$ of the engine 12 is equal to its effective volumetric expansion ratio $r_{VE}$, the pressure ratio $PR_{GT}$ of the boost compressor 20 has a value selected within a range defined from 2.5 to 9 when the engine assembly 10, 110 is operating at full power; for example, in a particular high altitude application, the pressure ratio $PR_{GT}$ of the boost compressor 20 may have a value within a range defined from 3 to 7 at full power, and in a particular low altitude application (e.g., turboshaft engine assembly), the pressure ratio $PR_{GT}$ of the boost compressor 20 may have a value within a range defined from 3 to 5 at full power. In another particular embodiment where the effective volumetric compression ratio $r_{VC}$ of the engine 12 is smaller than its effective volumetric expansion ratio $r_{VE}$ (Miller cycle), the pressure ratio $PR_{GT}$ of the boost compressor 20 has a value selected within a range defined from 3 to 12 when the engine assembly 10, 110 is operating at full power. Other values are also possible. The pressure ratio $PR_{GT}$ of the boost compressor 20 can be varied with speed and/or variable inlet guide vanes so that a wide range of values for the pressure ratio $PR_{GT}$ of the boost compressor 20 can be used across the operating envelope of the engine assembly 10, 110; the pressure ratio $PR_{GT}$ of the boost compressor 20 can also be varied based on other parameters, and can be for example lower at sea level and higher for higher altitudes. When the engine assembly 10, 110 is operating at low power, the pressure ratio $PR_{GT}$ of the boost compressor 20 can have low values, for example lower than the ranges and values provided above.

Figure 4:
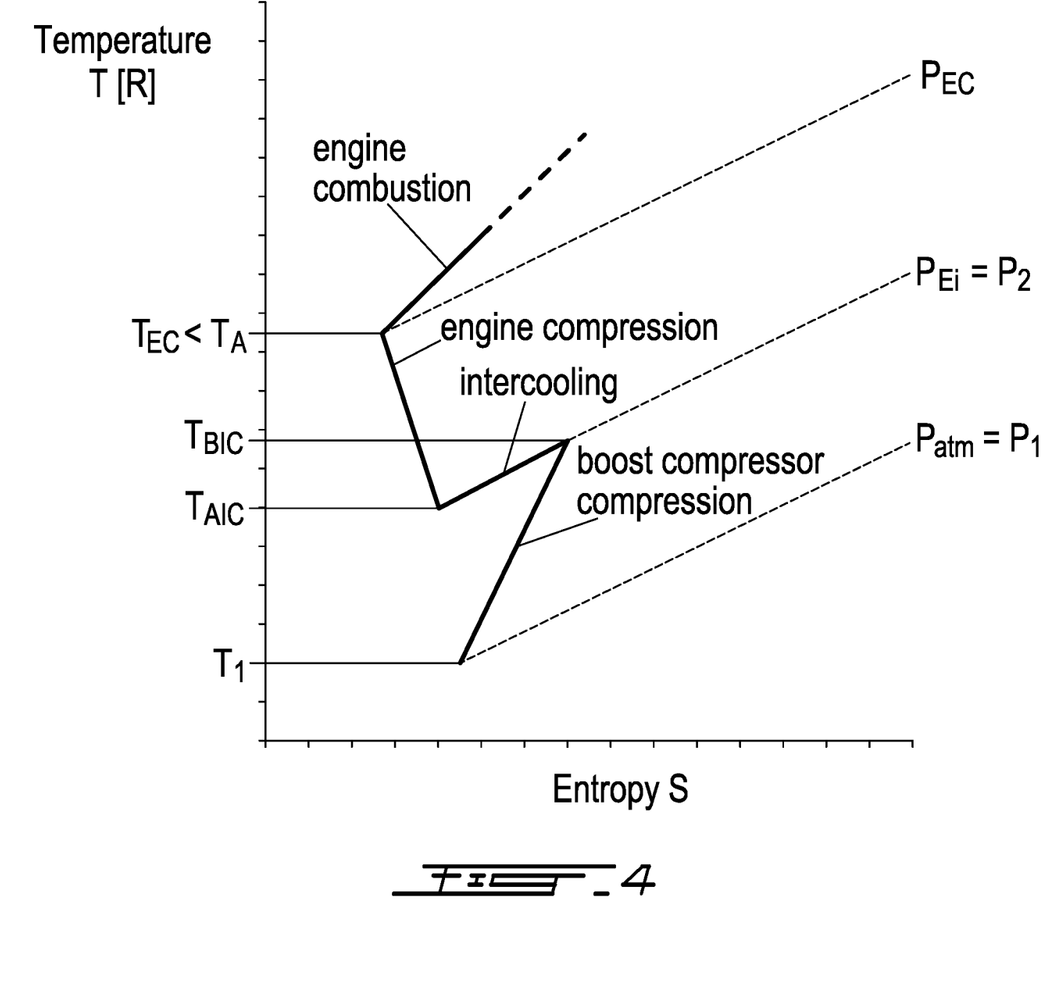
FIG. 4 is a schematic diagram of temperature variation as a function of entropy in a cycle of engine assemblies such as shown in FIGS. 1 and 2, in accordance with a particular embodiment.

Referring to FIG. 4, an exemplary schematic diagram of the temperature variations within the engine assembly 10, 110 is schematically shown, as a function of entropy S, with various pressure lines being indicated for reference. The pressure ratio between pressure lines $P_2$ and $P_1$ corresponds to $PR_{GT}$. The pressure ratio between pressure lines $P_{EC}$ and $P_2$ corresponds to $(r_{VC})^{(1+b)}$.

Figure 5:
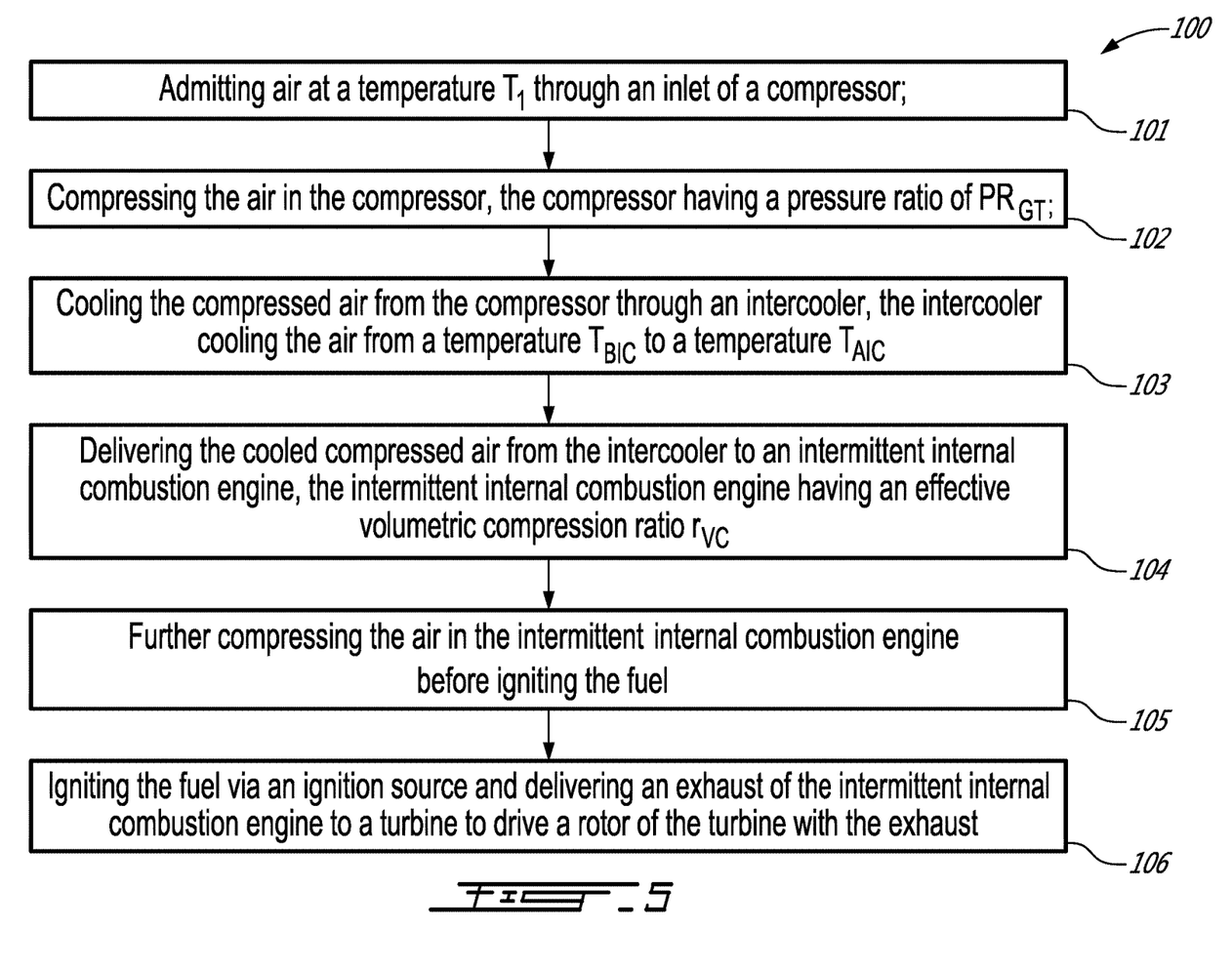
FIG. 5 is a block diagram illustrating a method of operating a combustion engine assembly as illustrated in FIGS. 1-2.

With reference to FIG. 5, there is shown a method 100 of performing combustion in an engine assembly such as discussed above. In use and in a particular embodiment, as at step 101, air (e.g., atmospheric air) at a temperature $T_1$ is admitted through the inlet of the boost compressor 20. The air is compressed by the compressor 20, as at step 102, so that the pressure of the air increases from the compressor inlet pressure $P_1$ (e.g., atmospheric pressure $P_{atm}$) to the compressor outlet pressure $P_2$, as determined by the pressure ratio of the compressor $PR_{GT}$. In the embodiment shown, a first temperature increase is also produced in the compressor 20, so that the air is heated from the compressor inlet temperature $T_1$ to the temperature $T_{BIC}$ before entering the intercooler 17.

The compressed air flows from the compressor 20 through the intercooler 17 so as to cool the air from the temperature $T_{BIC}$ to the temperature $T_{AIC}$, as at step 103. In the embodiment shown, there is no pressure loss or no significant pressure loss in the intercooler, so that the pressure $P_{Ei}$ at the inlet of the engine 12 is equal or substantially equal to the pressure $P_2$ at the compressor outlet.

The air is delivered from the intercooler 17 to engine 12, as at step 104, then further compressed in the engine 12 before the fuel is ignited, as at step 105, so as to obtain a pressure $P_{EC}$ in the engine before combustion, as determined by the effective volumetric compression ratio $r_{VC}$ of the engine 12. A second temperature increase is produced in the engine 12 as the air is compressed before combustion, so that the air reaches a temperature $T_{EC}$ before combustion which is below the temperature of auto-ignition $T_A$ of the fuel in the engine 12. In a particular embodiment where the engine 12 is a Wankel rotary engine, the air temperature and pressure in the engine 12 before combustion ($T_{EC}$, $P_{EC}$) are measured at the top dead center position of the rotor ($T_{DC}$).

The fuel is then ignited, as at step 106, and the exhaust gases are expanded in the engine 12, and in a particular embodiment, in the turbine(s) 22, 26 compounded with the engine 12.

In a particular embodiment, equation 1 set forth above provides an auto-ignition limit for the engine assembly 10, 110 which takes into account the amount of intercooling of the air before entering the engine 12, as well as the inlet temperature $T_1$ of the compressor 20, and the work split in compression ratios between the compressor 20 and the engine 12, regardless of if the fuel is injected through direct fuel injection or with premixing. Equation 1 can thus provide for a limit between an "Auto-Ignition Zone" and a normal zone, and allow achievement of an "auto-ignition-free" cycle. In a particular embodiment, equation 1 provides for an engine assembly 10, 110 having a relatively high thermal efficiency (e.g., from 35% to 45%). It is understood that although the engine 12 has been described in the embodiment shown as a Wankel rotary engine, equation 1 can also be used for any other suitable type of topping device that can perform compression, combustion and expansion, for example any type of intermittent internal combustion engine, including, but not limited to, reciprocating engines, other types of rotary engines, and internal combustion engines having any other configuration providing for a change in volume of one or more combustion chamber(s).

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method operating an engine assembly receiving fuel, the method comprising:
   admitting air at a temperature $T_1$ through an inlet of a compressor;
   compressing the air via the compressor to achieve a pressure ratio of $PR_{GT}$;
   cooling the compressed air from the compressor through an intercooler, the intercooler cooling the air from a temperature $T_{BIC}$ to a temperature $T_{AIC}$;
   delivering the cooled compressed air from the intercooler to an intermittent internal combustion engine, the intermittent internal combustion engine having an effective volumetric compression ratio $r_{VC}$;
   further compressing the air in the intermittent internal combustion engine before igniting the fuel; and
   driving an engine shaft drivingly engaged to at least one load with the intermittent internal combustion engine;
   wherein $$(PR_{GT})^a (r_{VC})^b \left(\frac{T_{AIC}}{T_{BIC}}\right)\left(\frac{T_1}{T_A}\right) < 1,$$

where:
   $T_A$ is an auto ignition temperature of the fuel in the intermittent internal combustion engine;
   $T_1$, $T_A$, $T_{BIC}$ and $T_{AIC}$ are in degrees Rankine and measured by sensors; and
   a and b are dimensionless constants greater than or equal to zero.

2. The method as defined in claim 1, wherein the compressor performs an adiabatic compression; and wherein the dimensionless constant a has a value of 0.336±0.04.

3. The method as defined in claim 1, wherein the intermittent internal combustion engine performs a polytropic compression; and wherein the dimensionless constant b has a value of 0.32±0.04.

4. The method as defined in claim 1, wherein the auto-ignition temperature of the fuel $T_A$ has a value of 1380±100 Rankine.

5. The method as defined in claim 1, wherein the intermittent internal combustion engine has an effective volumetric expansion ratio equal to the effective volumetric compression ratio $r_{VC}$; and wherein the pressure ratio $PR_{GT}$ of the compressor has a value within a range defined from 2.5 to 9.

6. The method as defined in claim 1, wherein the intermittent internal combustion engine has an effective volumetric expansion ratio greater than the effective volumetric compression ratio $r_{VC}$; and wherein the pressure ratio $PR_{GT}$ of the compressor has a value within a range defined from 3 to 12.

7. The method as defined in claim 1, wherein the intermittent internal combustion engine has an effective volumetric expansion ratio equal to the effective volumetric compression ratio $r_{VC}$; and wherein the effective volumetric compression ratio $r_{VC}$ has a value within a range defined from 4.5 to 8.

8. The method as defined in claim 1, wherein the intermittent internal combustion engine has an effective volumetric expansion ratio greater than the effective volumetric compression ratio $r_{VC}$; and wherein the effective volumetric compression ratio $r_{VC}$ has a value within a range defined from 2 to 5.5.

9. The method as defined in claim 1, wherein the intermittent internal combustion engine includes at least one Wankel rotor assembly including a rotor having three apex portions mounted for eccentric revolutions within an internal cavity defined in a housing, the internal cavity having an epitrochoid shape with two lobes.

10. A method of performing combustion in an engine assembly, the method comprising:
admitting air at a temperature $T_1$ through an inlet of a compressor;
compressing the air via the compressor to achieve a pressure ratio of $PR_{GT}$;
cooling the compressed air from the compressor through an intercooler, the intercooler cooling the air from a temperature $T_{BIC}$ to a temperature $T_{AIC}$;
delivering the cooled compressed air from the intercooler to an intermittent internal combustion engine, the intermittent internal combustion engine having an effective volumetric compression ratio $r_{VC}$;
further compressing the air in the intermittent internal combustion engine before igniting the fuel via an ignition source;
delivering an exhaust of the intermittent internal combustion engine to a turbine to drive a rotor of the turbine with the exhaust; and
driving an engine shaft drivingly engaged to the load to produce work;
wherein $$(PR_{GT})^a (r_{VC})^b \left(\frac{T_{AIC}}{T_{BIC}}\right)\left(\frac{T_1}{T_A}\right) < 1,$$

where:
$T_A$ is an auto ignition temperature of the fuel in the intermittent internal combustion engine;
$T_1$, $T_A$, $T_{BIC}$ and $T_{AIC}$ are in degrees Rankine and measured by sensors; and
a and b are dimensionless constants greater than or equal to zero.

11. The method as defined in claim 10, further comprising compounding power from the turbine with power from the intermittent internal combustion engine.

12. The method as defined in claim 10, wherein the compressor performs an adiabatic compressional, and wherein the dimensionless constant a has a value of 0.336±0.04.

13. The method as defined in claim 10, wherein the intermittent internal combustion engine performs a polytropic compression; and wherein the dimensionless constant b has a value of 0.32±0.04.

14. The method as defined in claim 10, wherein the auto-ignition temperature of the fuel $T_A$ has a value of 1380±100 Rankine.

15. The method as defined in claim 10, wherein the intermittent internal combustion engine has an effective volumetric expansion ratio equal to the effective volumetric compression ratio $r_{VC}$; and wherein the pressure ratio $PR_{GT}$ of the compressor has a value within a range defined from 2.5 to 9.

16. The method as defined in claim 10, wherein the intermittent internal combustion engine has an effective volumetric expansion ratio greater than the effective volumetric compression ratio $r_{VC}$; and wherein the pressure ratio $PR_{GT}$ of the compressor has a value within a range defined from 3 to 12.

17. The method as defined in claim 10, wherein the intermittent internal combustion engine has an effective volumetric expansion ratio equal to the effective volumetric compression ratio $r_{VC}$; and wherein the effective volumetric compression ratio $r_{VC}$ has a value within a range defined from 4.5 to 8.

18. The method as defined in claim 10, wherein the intermittent internal combustion engine has an effective volumetric expansion ratio greater than the effective volumetric compression ratio $r_{VC}$; and wherein the effective volumetric compression ratio $r_{VC}$ has a value within a range defined from 2 to 5.5.

19. The method as defined in claim 10, wherein the intermittent internal combustion engine includes at least one Wankel rotor assembly including a rotor having three apex portions mounted for eccentric revolutions within an internal cavity defined in a housing, the internal cavity having an epitrochoid shape with two lobes.

20. An engine assembly configured to burn fuel, the engine assembly comprising:
a compressor compressing air to achieve a pressure ratio of $PR_{GT}$;
an intercooler in fluid communication with an outlet of the compressor, the intercooler configured to cool air received from the compressor from a temperature $T_{BIC}$ to a temperature $T_{AIC}$;
an intermittent internal combustion engine having an inlet in fluid communication with the compressor through the intercooler, the intermittent internal combustion engine having an effective volumetric compression ratio rvc; and
an engine shaft drivingly engaged to the intermittent internal combustion engine and to at least one load to produce work;
wherein a pressure distribution between the compressor and the intermittent internal combustion engine is defined by $$(PR_{GT})^a (r_{VC})^b \left(\frac{T_{AIC}}{T_{BIC}}\right)\left(\frac{T_1}{T_A}\right) < 1,$$

where:
$T_1$ is a temperature of the air at an inlet of the compressor;
$T_A$ is an auto ignition temperature of the fuel in the intermittent internal combustion engine;
$T_1$, $T_A$, $T_{BIC}$ and $T_{AIC}$ are in degrees Rankine and measured by sensors; and
a and b are dimensionless constants greater than or equal to zero.

21. The engine assembly as defined in claim 20, further comprising a turbine having an inlet in fluid communication with an exhaust of the internal combustion engine, the turbine compounded with the internal combustion engine.

22. The engine assembly as defined in claim 20, wherein the intermittent internal combustion engine includes at least one Wankel rotor assembly including a rotor having three apex portions mounted for eccentric revolutions within an internal cavity defined in a housing, the internal cavity having an epitrochoid shape with two lobes.

23. The engine assembly as defined in claim 20, wherein the compressor is configured to perform an adiabatic compression; and wherein the dimensionless constant a has a value of 0.336±0.04.

24. The engine assembly as defined in claim 20, wherein the intermittent internal combustion engine is configured to perform a polytropic compression; and wherein the dimensionless constant b has a value of 0.32±0.04.

* * * * *